April 7, 1931.                M. A. KISHELL                1,800,081
                            GRASS CUTTING DEVICE
                         Filed Aug. 1, 1928   2 Sheets-Sheet 1
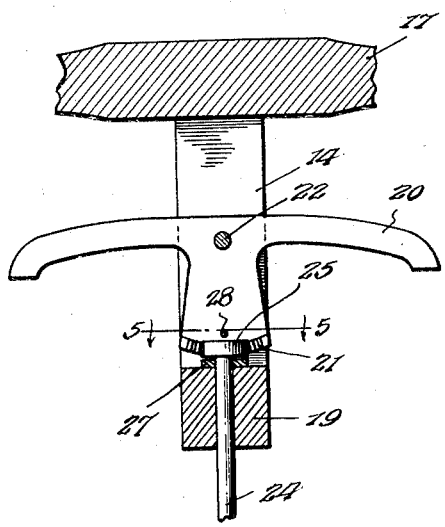
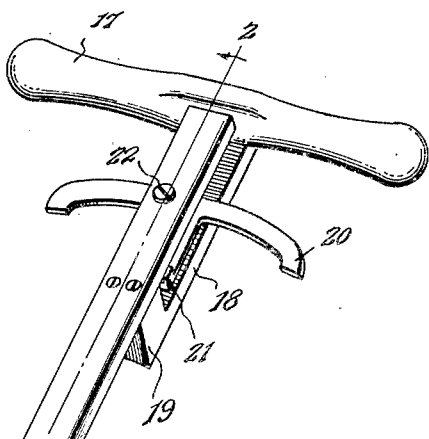
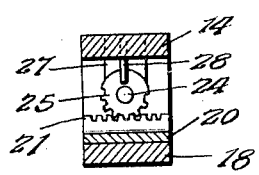
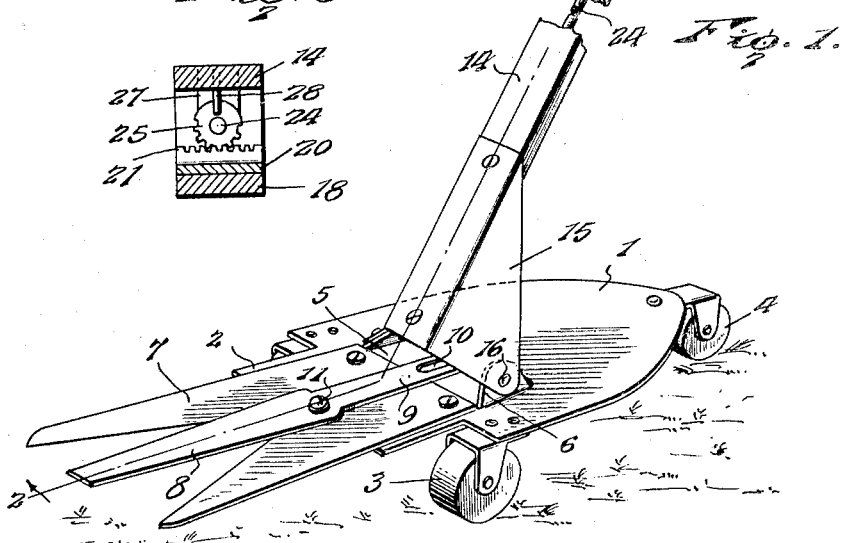
INVENTOR.
M. A. Kishell.
BY
Lacey & Lacey, ATTORNEYS.

April 7, 1931. M. A. KISHELL 1,800,081
GRASS CUTTING DEVICE
Filed Aug. 1, 1928   2 Sheets-Sheet 2
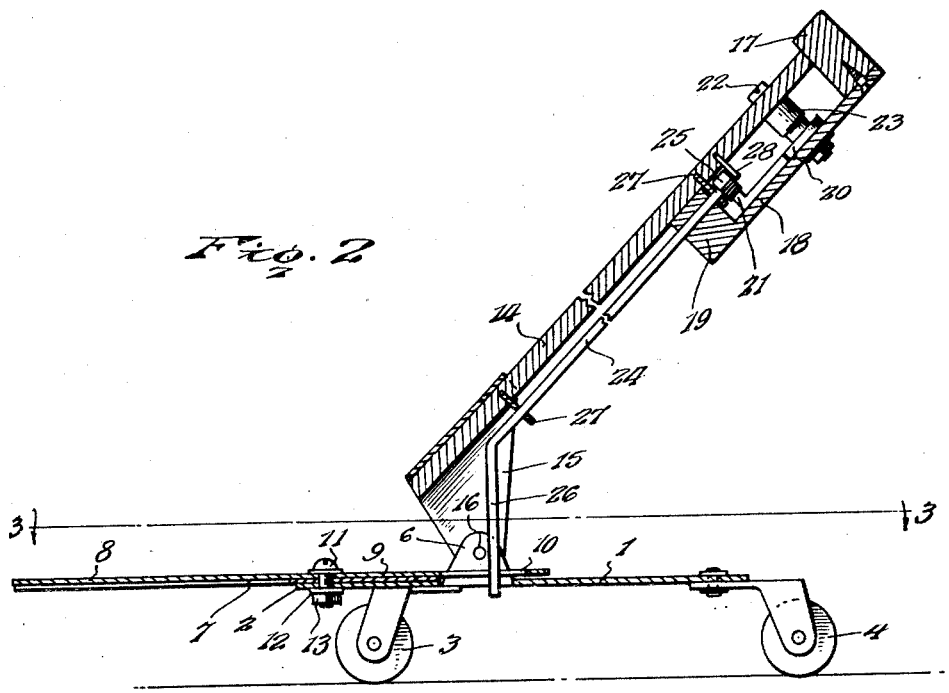
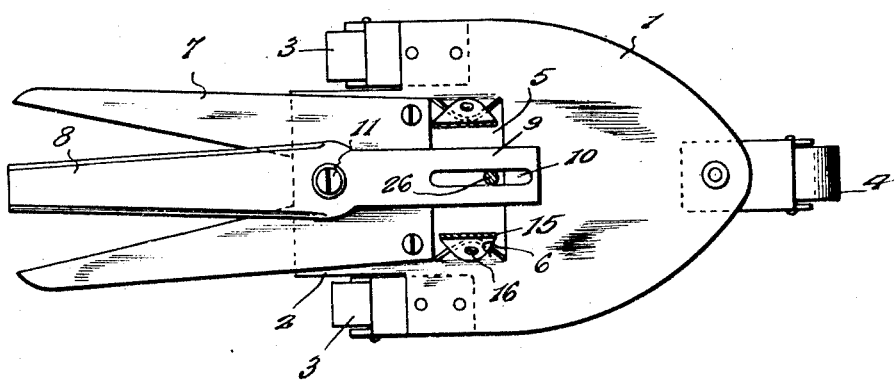
INVENTOR.
M. A. Kishell.
BY
Lacey & Lacey, ATTORNEYS Patented Apr. 7, 1931

1,800,081

UNITED STATES PATENT OFFICE

MICHAEL A. KISHELL, OF DICKSON CITY, PENNSYLVANIA

GRASS-CUTTING DEVICE

Application filed August 1, 1928. Serial No. 296,787.

This invention relates to an improved grass cutting device.

One object of the invention is to provide a device having a double-edged blade and a knife coacting with the blade to cut grass at each throw of the knife.

Another object of the invention is to provide a grass cutting device wherein the operator may, from a standing position, actuate said device.

A further object of the invention is to provide a cutting device particularly adapted for trimming as well as cutting tall grass.

Other objects of the invention not specifically mentioned in the foregoing will appear during the course of the following description.

In the drawings:

Figure 1 is a perspective view of the device.

Figure 2 is a sectional view of the device on the line 2—2 of Figure 1, looking in the direction indicated by the arrows.

Figure 3 is a horizontal sectional view of the device on the line 3—3 of Figure 2, looking in the direction indicated by the arrows.

Figure 4 is a fragmentary sectional view showing more clearly the knife actuating mechanism.

Figure 5 is a fragmentary sectional view on the line 5—5 of Figure 4, looking in the direction indicated by the arrows.

Referring more particularly to the accompanying drawings, the numeral 1 indicates a body plate or frame which is substantially oblong in shape and having its rear portion rounded, said frame being preferably formed of sheet metal and stamped into shape. The frame is provided with a forward extension 2.

Carried at the base of the extension and at each side thereof are supporting wheels 3 and carried on the rear of the frame is a caster wheel 4. Formed transversely in the frame is an oblong opening 5 and projecting upwardly at each end of said oblong opening are ears 6. Overlying the extension 2 and detachably secured thereto is a fixed substantially V-shaped blade 7 forming diverging cutting edges. Overlying the fixed blade is a double-edged movable blade or knife 8 having a tail piece 9 provided with a slot 10. Extending medially through both blades is a bolt 11 providing a pivot for said movable blade, said bolt being provided with a spring washer 12 and a nut 13 for yieldably holding the movable blade in engagement with the plate 7.

Extending upwardly and rearwardly with respect to the frame 1 is a handle bar 14 formed preferably of wood, although other materials may be employed, and mounted on the lower end of said bar is a yoke 15 which is stamped from sheet metal. Extending through the sides of said yoke at the lower portions thereof are bolts 16 pivotally securing said yoke to the ears 6 of the fram 1.

Carried on the bar 14 at its upper end is a handle 17 and mounted at the lower side of said bar at its upper end portion is an angle plate 18. This plate is provided with a short thickened end 19 which is secured to the bar while the opposite end of said plate extends beneath the handle and is secured thereto.

Disposed between the angle plate 18 and the handle bar 14 is a substantially T-shaped lever 20 having the stem thereof provided with upwardly projecting teeth 21, and extending through the bar 14, the lever, and said plate 18 is a bolt 22 forming a pivot for said lever, the lever being limited against upward movement by a spacing washer 23. The lever 20 is provided with curved arms and is disposed in close spaced relation to the handle 17.

Extending freely through the thickened end of the angle plate 18 is a shaft 24 and fixed on the upper end of said shaft is a mutilated gear 25 meshing with the upwardly projecting teeth 21 of the lever 20. The lower end of the shaft is bent downwardly to form an oblique arm 26 which extends freely through the slot 10 of the tail piece 9 of the movable blade 8 into the opening 5 of the frame 1.

Driven into the bar 14 are bearings 27 journaling the shaft near its ends, and driven into the bar in spaced relation to the upper end of said shaft is a stop pin 28 for limiting the shaft against upward displacement.

As will now be seen, the handle 17 may be grasped for pushing the device forwardly while, at the same time, the fingers may be engaged with the ends of the lever 20 for rocking said lever and oscillating the movable blade 8 to effect the cutting operation.

Having thus described the invention, what is claimed is:

1. A grass cutting device including a frame provided with an opening, a fixed blade mounted on the frame, a movable blade pivoted on said fixed blade, said movable blade having a tail piece provided with an oblong slot, a handle pivoted on the frame, and means carried on said handle to engage in said slot at said opening and coacting with the tail piece for actuating the movable blade.

2. A grass cutting device including a frame having an opening and provided at opposite ends of said opening with upwardly projecting ears, relatively fixed and movable blades connected with the frame, said movabe blade having a tail piece, a handle bar associated with the frame, a yoke swingingly connecting the handle bar to the ears of the frame and straddling the opening, said yoke re-enforcing the frame at the opening and tending to give balance to the device, a handle carried by the handle bar, and means carried by the handle bar for engaging the tail piece and actuating the movable blade.

In testimony whereof, I affix my signature.

MICHAEL A. KISHELL. [L. S.]